US011156296B2

(12) United States Patent
Liu et al.

(10) Patent No.: US 11,156,296 B2
(45) Date of Patent: Oct. 26, 2021

(54) FLOW CONTROL VALVE

(71) Applicant: Zhejiang Sanhua Automotive Components Co., Ltd., Zhejiang (CN)

(72) Inventors: Xibo Liu, Zhejiang (CN); Shizhao Yang, Zhejiang (CN); Wenrong Zhou, Zhejiang (CN)

(73) Assignee: Zhejiang Sanhua Automotive Components Co., Ltd., Zhejiang (CN)

( * ) Notice: Subject to any disclaimer, the term of this patent is extended or adjusted under 35 U.S.C. 154(b) by 0 days.

(21) Appl. No.: 16/624,822

(22) PCT Filed: Jun. 11, 2018

(86) PCT No.: PCT/CN2018/090582
§ 371 (c)(1),
(2) Date: Dec. 19, 2019

(87) PCT Pub. No.: WO2019/001249
PCT Pub. Date: Jan. 3, 2019

(65) Prior Publication Data
US 2020/0124181 A1    Apr. 23, 2020

(30) Foreign Application Priority Data

Jun. 30, 2017   (CN) ......................... 201710518984.6
Jun. 30, 2017   (CN) ......................... 201710519696.2

(51) Int. Cl.
*F16K 1/44*          (2006.01)
*F16K 1/36*          (2006.01)
(Continued)

(52) U.S. Cl.
CPC .................. *F16K 1/44* (2013.01); *F16K 1/36* (2013.01); *F16K 1/42* (2013.01); *F16K 27/02* (2013.01);
(Continued)

(58) Field of Classification Search
CPC ............... F16K 1/36; F16K 1/44; F23B 41/04
See application file for complete search history.

(56) References Cited

U.S. PATENT DOCUMENTS

2012/0313021 A1   12/2012   Da Pont et al.
2013/0306176 A1   11/2013   Harada et al.
(Continued)

FOREIGN PATENT DOCUMENTS

CN        1213755 A     4/1999
CN      101122343 A     2/2008
(Continued)

OTHER PUBLICATIONS

International Search Report and Written Opinion for International Application No. PCT/CN2018/090582, dated Aug. 30, 2018.
(Continued)

*Primary Examiner* — Kevin L Lee
(74) *Attorney, Agent, or Firm* — Wolf, Greenfield & Sacks, P.C.

(57) ABSTRACT

An electric valve includes a valve body, a spool assembly, and a coil assembly. The spool assembly includes a piston, a valve seat, a valve needle, and a rotor. The valve seat is provided with a first valve port. The valve body is provided with a first port, a second port, a second valve port, and a bypass channel. One end of the first valve port keeps communication with the first port, and another end of the first valve port is in communication with the second port by means of the bypass channel. A second valve port is arranged in a bottom wall of the cavity having an open end, at least part of an outer wall of the valve seat is in sealing engagement with an inner wall of the cavity having an open end. A third valve port is arranged between the second valve port and the second port. A check valve is directly disposed between the third valve port and the second port.

17 Claims, 6 Drawing Sheets

(51) Int. Cl.
    *F16K 1/42*     (2006.01)
    *F16K 27/02*    (2006.01)
    *F25B 41/20*    (2021.01)
    *F25B 41/34*    (2021.01)

(52) U.S. Cl.
    CPC ....... *F17C 2205/0326* (2013.01); *F25B 41/20* (2021.01); *F25B 41/34* (2021.01)

(56) References Cited

U.S. PATENT DOCUMENTS

| | | | | |
|---|---|---|---|---|
| 2015/0144819 | A1* | 5/2015 | Pifer et al. | F16K 17/0413 251/129.15 |
| 2018/0038507 | A1 | 2/2018 | Ninomiya et al. | |
| 2018/0202569 | A1* | 7/2018 | Kawase et al. | F16K 31/04 |

FOREIGN PATENT DOCUMENTS

| | | |
|---|---|---|
| CN | 101135385 A | 3/2008 |
| CN | 101769389 A | 7/2010 |
| CN | 102844601 A | 12/2012 |
| CN | 103423462 A | 12/2013 |
| CN | 103912688 A | 7/2014 |
| CN | 104405950 A | 3/2015 |
| CN | 105276199 A | 1/2016 |
| CN | 105822769 A | 8/2016 |
| CN | 105889597 A | 8/2016 |
| FR | 2784439 A1 | 4/2000 |
| JP | S44-5664 Y1 | 2/1969 |
| JP | H07-167192 A | 7/1995 |
| JP | H11-111519 A | 4/1999 |
| JP | 2004-316718 A | 11/2004 |
| JP | 2005-221115 A | 8/2005 |
| JP | 2007-225091 A | 9/2007 |
| JP | 2013-036487 A | 2/2013 |
| JP | 2013-217408 A | 10/2013 |
| JP | 2013-241958 A | 12/2013 |
| WO | WO 2016/136239 A1 | 9/2016 |

OTHER PUBLICATIONS

Chinese Office Action dated Jul. 2, 2019 in connection with Chinese Application No. 201710518984.6, and English translation thereof.
Chinese Office Action dated Jul. 18, 2019 in connection with Chinese Application No. 201710519696.2, and English translation thereof.
Japanese Search Report dated Jan. 14, 2021 in connection with Japanese Application No. 2019-571540, and English translation thereof.

* cited by examiner

FLOW CONTROL VALVE

This application is a national stage filing under 35 U.S.C. § 371 of International Patent Application Serial No. PCT/CN2018/090582, filed Jun. 11, 2018, which claims priority to the following two Chinese Patent Applications, the contents of these applications are incorporated herein by reference in their entireties:

1) Chinese Patent Application No. 201710519696.2, titled "ELECTRIC VALVE", filed with the China National Intellectual Property Administration on Jun. 30, 2017; and 2) Chinese Patent Application No. 201710518984.6, titled "ELECTRIC VALVE", filed with the China National Intellectual Property Administration on Jun. 30, 2017.

FIELD

The present application relates to the field of fluid control, and in particular to an electric valve.

BACKGROUND

As people's requirements for energy conservation and emission reduction are getting higher and higher, the performance requirements for air-conditioning systems are also getting higher and higher. A heat pump air-conditioning system has also become a popular application. However, a traditional expansion valve, whether an electronic expansion valve or a thermal expansion valve, can only play a role of throttling. If functions of throttling, full opening and full closing are required to be realized, multiple expansion valves and multiple solenoid valves are generally needed in one air conditioning system.

With the increasing performance requirements for the air conditioning systems, the increasing compactness requirements for the air conditioning systems, and also based on the consideration of cost, providing an electric Valve having the functions of throttling, full opening and full closing is a technical problem that those skilled in the art urgently need to solve.

SUMMARY

In order to solve the above technical problem, the technical solution of the present application is to provide an electric valve having the functions of throttling, full opening and full closing.

An electric valve is provided according to embodiments of the present application, which includes a valve body, a valve core assembly and a coil assembly. The valve core assembly includes a piston, a valve seat, a valve needle and a rotor. A return spring is arranged between the piston and the valve seat, one end of the return spring abuts against the piston, another end of the return spring abuts against the valve seat, and the return spring is in a compressed state. The valve seat is provided with a first valve port. The valve body is provided with a cavity having an open end, and a second valve port is arranged on a bottom wall of the cavity having an open end. At least a portion of an outer wall of the valve seat is in sealing engagement with an inner wall of the cavity having an open end, and the piston is in sliding fit with the inner wall of the cavity having an open end. The valve body is further provided with a first port, a second port, a second valve port and a bypass passage. The piston is provided with a fluid passage which is in communication with the first port and an end portion of the first valve port. One end portion of the first valve port is kept in communication with the first port, and another end portion of the first valve port is in communication with the second port through the bypass passage. A third valve port is arranged between the second valve port and the second port, and a one-way valve is arranged between the third valve port and the second port.

In a case that the second port serves as an inlet, when the valve needle is away from the first valve port and at least part of the valve needle is in the first valve port, a flow area of a throttling passage formed between the valve needle and the first valve port is less than a cross-sectional area of the first valve port; at this time, the piston abuts against the second valve port, and the second valve port, is closed; the one-way valve abuts against the third valve port, and the third valve port is closed; the second port is in communication with the first port through the bypass passage and the first valve port; and the flow area of the throttling passage formed between the valve needle and the first valve port varies according to a distance between the valve needle and the first valve port.

Another electric valve is further provided according to the embodiments of the present application, which includes a valve body, a valve core assembly and a coil assembly. The valve core assembly includes a piston, a valve seat, a valve needle and a rotor. A return spring is arranged between the piston and the valve seat, one end of the return spring abuts against the piston, another end of the return spring abuts against the valve seat, and the return spring is in a compressed state. The valve seat is provided with a first valve port. The valve body is provided with a cavity having an open end, and a second valve port is arranged on a bottom wall of the cavity having an open end. At least two portions of an outer wall of the valve seat are in sealing engagement with an inner wall of the cavity having an open end, and the first valve port is located between the two portions of the valve seat in sealing engagement with the inner wall of the cavity having an open end. The valve body is further provided with a first port, a second port, a second valve port and a bypass passage. The piston is provided with a fluid passage which is in communication with the first port and an end portion of the first valve port. One end portion of the first valve port is kept in communication with the first port, and another end portion of the first valve port is in communication with the second port through the bypass passage.

When the valve needle is away from the first valve port and at least part of the valve needle is in the first valve port, a flow area of a throttling passage formed between the valve needle and the first valve port is less than a cross-sectional area of the first valve port, and the electric valve is in a throttling state; at this time, the piston abuts against the second valve port, and the second valve port is closed; the first port is in communication with the second port through the first valve port and the bypass passage; and the flow area of the throttling passage formed between the valve needle and the first valve port varies according to a distance between the valve needle and the first valve port.

In a case that the second port serves as an inlet, the electric valve can realize the functions of full closing and throttling, and the functions of throttling, full opening and full closing can be realized in a case that the second port serves as an outlet, achieving a fluid flow control of two-way throttling, large flow full opening and full closing.

Figure 1:
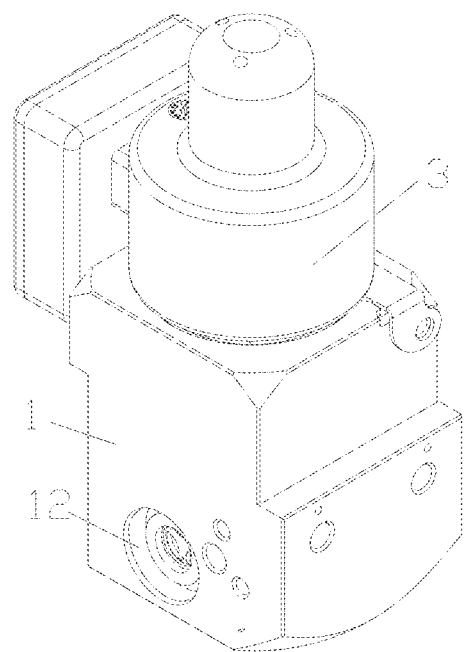
FIG. 1 is a schematic perspective view showing the structure of an electric valve according to an embodiment of the present application.

The arrows in the drawings indicate schematic directions of fluid flow.

DETAILED DESCRIPTION OF EMBODIMENTS

The technical solutions of the present application are specifically described below with reference to the drawings and specific embodiments, and the orientation nouns described in the specification are described in accordance with the orientation relationship in the drawings or in accordance with the implied orientation relationship in the drawings.

As shown in FIG. 1, an electric valve includes a valve body 1, a valve core assembly 2 and a coil assembly 3, wherein the coil assembly 3 may be arranged around the valve core assembly 2, and the coil assembly 3 may be fixed to the valve body 1 by screws. The coil assembly 3 may be provided with a circuit board and a connector, and the circuit board may be integrated with the connector.

As shown in FIGS. 2 to 5, the valve core assembly 2 includes a piston 5, a valve seat 4, a valve needle 21 and a rotor 22. A return spring 7 is provided between the piston 5 and the valve seat 4, one end of the return spring 7 abuts against the piston 5, another end of the return spring 7 abuts against the valve seat 4, and the return spring 7 is in a compressed state. The valve seat 4 is fixed to the valve body 1, the rotor 22 can be rotated by the coil assembly 3, and the valve needle 21 can be driven by the rotor 22 to feed up and down.

Figure 4:
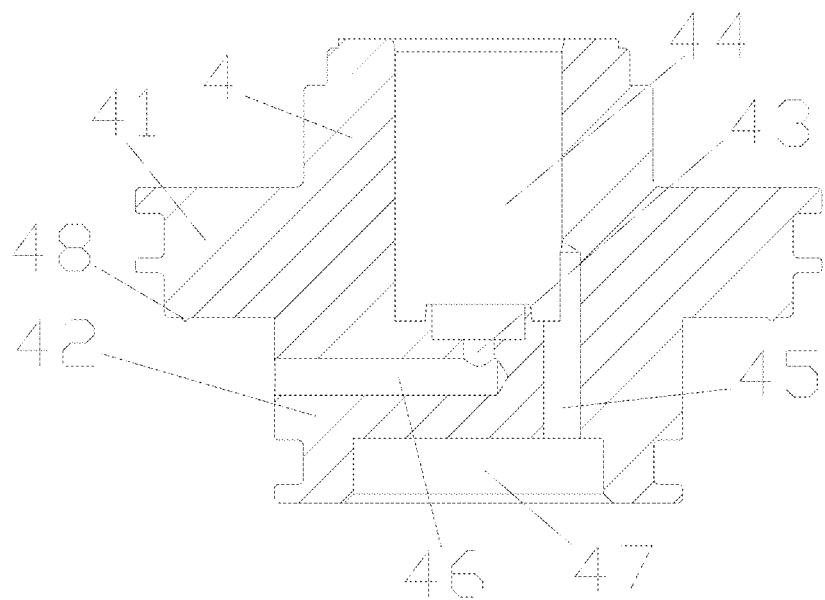
FIG. 4 is a schematic sectional view of the valve seat of the electric valve shown in FIG. 1.

As shown in FIG. 4, the valve seat 4 includes a first valve seat body 41 at an upper portion and a second valve seat body 42 at a lower portion, wherein the first valve seat body 41 is adjacent to the second valve seat body 42, an outer diameter of the first valve seat body 41 is greater than an outer diameter of the second valve seat body 42, and at least one groove for accommodating a sealing member is provided on an outer wall of the first valve seat body 41. In the present embodiment, two grooves for accommodating the sealing member are provided. The valve seat 4 is further provided with a valve seat upper cavity 44 and a valve seat lower cavity 47, the valve seat upper cavity 44 is open at an end relatively away from the valve seat lower cavity 47, and the valve seat lower cavity 47 is open at an end relatively from the valve seat upper cavity 44. The valve seat 4 is further provided with a second passage 45 which is in communication with the valve seat upper cavity 44 and the valve seat lower cavity 47. The valve seat 4 is further provided with a first valve port 43, the first valve port 43 is arranged at a portion of the valve seat 4 corresponding to a bottom of the valve seat upper cavity 44, and the first valve port 43 is adjacent to the second passage 45. The second valve seat body 42 is provided with a first passage 46, one end of the first passage 46 is in communication with the first valve port 43, and another end of the first passage 46 is located on an outer wall of the second valve seat body 42. The first valve port 43 can communicate with the outside of the valve seat 4 through the first passage 46. A second valve port 13 is arranged in a bottom wall of the cavity having an open end, at least part of an outer wall of the valve seat 4 is in sealing engagement with an inner wall of the cavity having an open end.

The outer wall of the second valve seat body 42 may also be provided with a groove for accommodating the sealing member, and the groove of the outer wall of the second valve seat body 42 is located below the first passage 46.

It should be noted here that in other embodiments, the valve seat lower cavity 47 may not be provided, and the valve seat upper cavity 44 may communicate with the outside of the valve seat 4 through the second passage 45. In the present embodiment, one end of the return spring 7 can be accommodated in the valve seat lower cavity 47 by providing the valve seat lower cavity 47, which improves the stability of the return spring 7 and prevents the return spring 7 from skewing.

Figure 2:
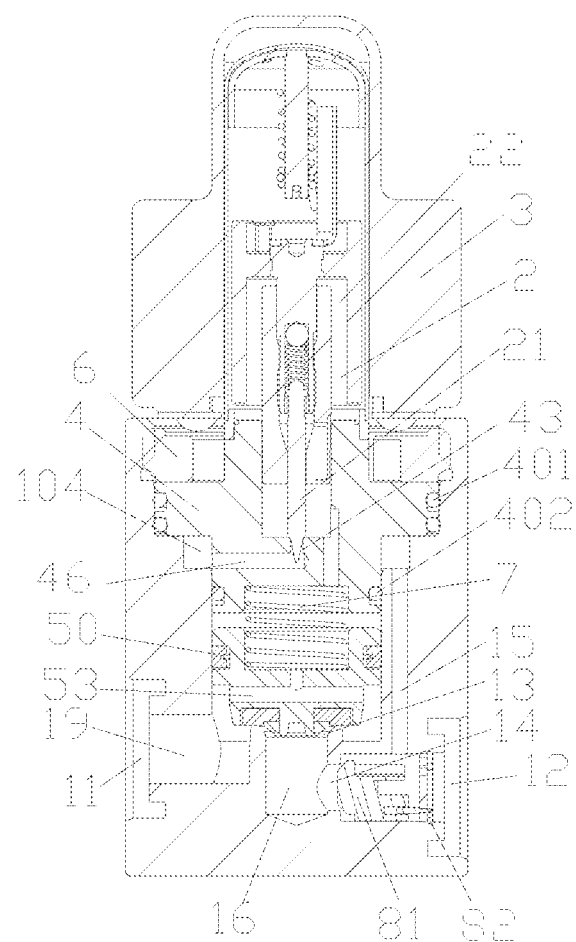
FIG. 2 is a schematic sectional view of the electric valve shown in FIG. 1 in a fully closed state.

As shown in FIG. 2, the rotor 22 can drive the valve needle 21 to move up and down, so that the valve needle 21 can move away from or abut against the first valve port 43. A flow rate of the fluid through the first valve port 43 can be controlled by a distance relationship between the valve needle 21 and the first valve port 43. When the valve needle 21 abuts against the first valve port 43, the first valve port 43 is closed and the fluid cannot pass through the first valve port 43. As the valve needle 21 gradually moves away from the first valve port 43, the flow rate of the fluid through the first valve port 43 increases gradually, and when a flow area of the fluid through the first valve port 43 is less than that of the first passage 46 and/or the second passage 45, a passage formed between the valve needle 21 and the first valve port 43 can serve as a throttling passage. In a case that a high pressure refrigerant passes through the passage formed between the valve needle 21 and the first valve port 43, the high pressure refrigerant transforms to a low pressure refrigerant after depressurized. In the present embodiment, an inner diameter of the first valve port 43 is less than an inner diameter of the first passage 46 and/or the second passage 45.

Figure 3:
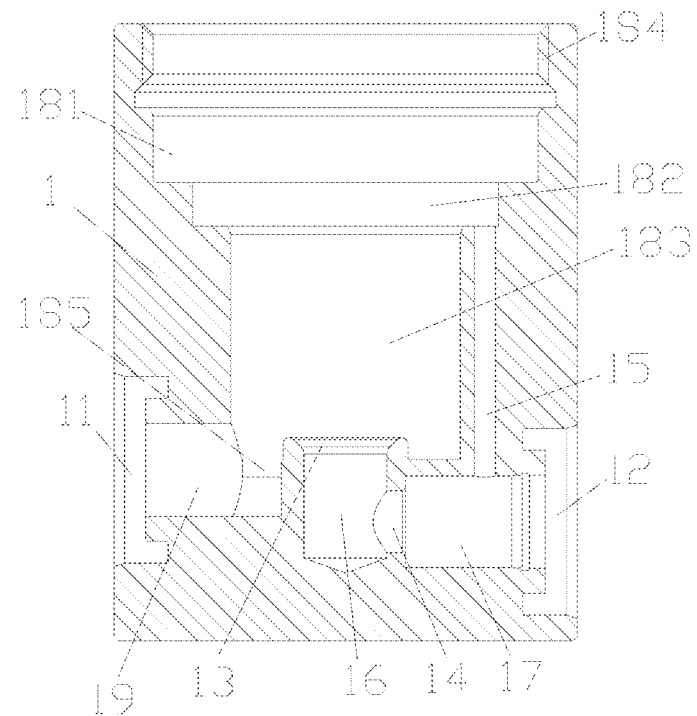
FIG. 3 is a schematic sectional view of the valve body of the electric valve shown in FIG. 1.

As shown in FIG. 3, the valve body 1 is provided with a cavity having an open end. The cavity includes a first sub-cavity 181, a second sub-cavity 182, and a third sub-cavity 183. The valve body 1 is provided with a first port 11, a second port 12, a first cavity 19, a second cavity 16, a third cavity 17, the first sub-cavity 181, the second sub-cavity 182 and the third sub-cavity 183, wherein the first sub-cavity 181, the second sub-cavity 182 and the third sub-cavity 183 are arranged from top to bottom and are sequentially in communication with each other, an inner diameter of the first sub-cavity 181 is greater than an inner diameter of the second sub-cavity 182, and the inner diameter of the second sub-cavity 182 is greater than an inner diameter of the third sub-cavity 183. An end of the first sub-cavity 181 is open, and the valve body 1 is provided with an internal thread 184 close to the opening portion of the first sub-cavity 181.

The first port 11 is in communication with the first cavity 19, and the first cavity 19 is in communication with the third sub-cavity 183. A communication portion 185 may be further arranged between the first cavity 19 and the third sub-cavity 183, and a bottom wall of the communication portion 185 has a spiral structure. By providing the communication portion 185, the fluid can flow more smoothly between the first cavity 19 and the third sub-cavity 183, and the communication portion 185 can guide the fluid flow.

The second cavity 16 is located below the third sub-cavity 183, and the second cavity 16 is located between the first cavity 19 and the third cavity 17. The first cavity 19 is not in direct communication with the second cavity 16, and the second cavity 16 is in communication with the third cavity 17. A second valve port 13 is further provided between the second cavity 16 and the third sub-cavity 183, and the first cavity 19 can communicate with the second cavity 16 through the third sub-cavity 183 and the second valve port 13.

The third cavity 17 is in communication with the second port 12. The third sub-cavity 183 can communicate with the second port 12 through the second valve port 13, the second cavity 16 and the third cavity 17, and/or the third sub-cavity 183 can communicate with the second port 12 through the second sub-cavity 182, a bypass passage 15 and the third cavity 17.

In the present embodiment, a third valve port 14 is further provided between the second cavity 16 and the third cavity 17, and the second cavity 16 is in communication with the third cavity 17 through the third valve port 14.

The valve body 1 is further provided with the bypass passage 15, one end of the bypass passage 15 is in communication with the second sub-cavity 182, another end of the bypass passage 15 is in communication with the third cavity 17, and the bypass passage 15 is in communication with the second sub-cavity 182 and the third cavity 17. In the present embodiment, the bypass passage 15 is parallel to the third sub-cavity 183, that is, the bypass passage 15 extends in a same direction as the third sub-cavity 183, so that when processing the bypass passage 15, a cutting tool can directly pass through a bottom wall of the second sub-cavity 182 to the third cavity 17.

Figure 5:
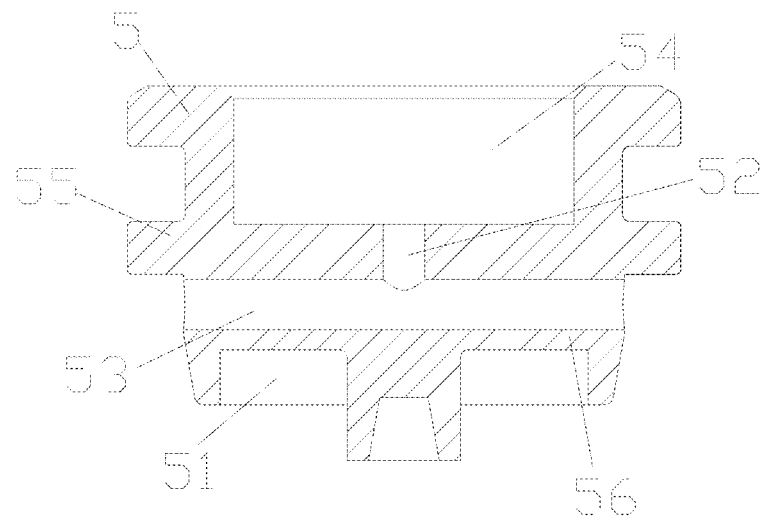
FIG. 5 is a schematic sectional view of the piston of the electric valve shown in FIG. 1.

As shown in FIG. 5, the piston 5 includes a first piston body 55 and a second piston body 56, wherein an outer diameter of the first piston body 55 is greater than an outer diameter of the second piston body 56. The piston 5 is further provided with a piston upper cavity 54 and a sealing block accommodating cavity 51, and the piston upper cavity 54 and the sealing block accommodating cavity 51 are located on opposite sides of the piston 5. The piston 5 is further provided with a first sub-passage 52 and a second sub-passage 53, wherein one end of the first sub-passage 52 is located on a corresponding bottom wall of the piston upper cavity 54, and another end of the first sub-passage 52 is in communication with the second sub-passage 53. The second sub-passage 53 is located below the first sub-passage 52, and the piston upper cavity 54 can communicate with the outside of the piston successively through the first sub-passage 52 and the second sub-passage 53.

Moreover, the second sub-passage 53 includes at least one port located on an outer wall of the second piston body 56. In a case that the number of ports of the second sub-passage 53 located on the outer wall of the second piston body 56 is greater than or equal to 2, the fluid can flow more smoothly through the second sub-passage 53 to the first sub-passage 52.

With reference to FIGS. 2, 3 and 4, the outer wall of the first valve seat body 41 of the valve seat 4 is in clearance fit with an inner wall of the first sub-cavity 181 of the valve body 1, and at least one first sealing member 401 is arranged between the outer wall of the first valve seat body 41 and the inner wall of the first sub-cavity 181 of the valve body. The outer wall of the second valve seat body 42 is in clearance fit with an inner wall of the third sub-cavity 183 of the valve body, and at least one second sealing member 402 is arranged between the outer wall of the second valve seat body 42 and the inner wall of the third sub-cavity 183 of the valve body. The port of the first passage 46 on the outer wall portion of the second valve seat body 42 is located in the second sub-cavity 182. Since the inner diameter of the second sub-cavity 182 is greater than the inner diameter of the third sub-cavity 183, an annular passage 104 is formed between the inner wall of the second sub-cavity 182 of the valve body and the outer wall of the second valve seat body 42. The annular passage 104 is in communication with the first passage 46, while the annular passage 104 is also in communication with the bypass passage 15.

The valve seat 4 is fixed to the valve body 1 through a pressing block 6. The pressing block 6 is provided with an external thread, and the external thread of the pressing block 6 is in threaded connection with the internal thread 184 of the first sub-cavity 181.

In order to improve the sealing performance between the valve seat 4 and the inner wall of the first sub-cavity 181 of the valve body, at least one annular tooth-shaped projection 48 is arranged at a lower end portion of the first valve seat body 41, the tooth-shaped projection 48 abuts against the bottom wall of the first sub-cavity 181, and the hardness of the tooth-shaped projection 48 is greater than that of the bottom wall of the first sub-cavity 181 of the valve body. When the tooth-shaped projection 48 abuts against the bottom wall of the first sub-cavity 181 of the valve body, the tooth-shaped projection 48 can be embedded into the bottom wall of the first sub-cavity 181 of the valve body, thereby further improving the sealing performance and reducing the risk of leakage. Obviously, the tooth-shaped projection may also be arranged on the bottom wall of the first sub-cavity of the valve body. It should be noted that the risk of external leakage of the electric valve can be reduced by providing the first sealing member 401 and the tooth-shaped projection 48, and the risk of internal leakage of the electric valve can be reduced by providing the second sealing member 402.

With reference to FIG. 5, an outer wall of the first piston body 55 of the piston 5 is sliding fit with the inner wall of the third sub-cavity 183 of the valve body, and a third sealing member is arranged between the outer wall of the first piston body 55 and the inner wall of the third sub-cavity 183. There is a certain distance between the outer wall of the second piston body 56 and the inner wall of the third sub-cavity 183, such that the first cavity 19 can keep in communication with the valve seat upper cavity 44 through the second sub-passage 53, the first sub-passage 52 and the second passage 45. A sealing block is arranged in the sealing block accommodating cavity 51, and the piston 5 can abut against the second valve port 13 under the action of the return spring 7.

As shown in FIG. 2, in the present embodiment, a one-way valve is further provided in the third cavity 17, the one-way valve includes a one-way valve core 81 and a bracket 82, and the one-way valve core 81 can slide freely along the bracket 82. When the fluid pressure on a side where the second port 12 is located is greater than the fluid pressure on a side where the third valve port 14 is located, the one-way valve core 81 abuts against the third valve port 14, and the third valve port 14 is closed. When the fluid pressure on the side where the second port 12 is located is less than the fluid pressure on the side where the third valve port 14 is located, the one-way valve core 81 is away from the third valve port 14, and the third valve port 14 is opened.

It should be noted here that the one-way valve may not be provided in the electric valve of other embodiments.

The working mode of the electric valve of the present embodiment is further described below with reference to the drawings.

As shown in FIG. 2, the electric valve is in a fully closed state, the valve needle 21 abuts against the first valve port 43, the piston 5 abuts against the second valve port 13 under the action of the return spring 7, and the first port 11 is not in communication with the second cavity 16, such that the first port 11 is not in communication with the second port 12. It should be noted here that when the piston 5 moves downward to close the second valve port 13, the second cavity 16 is in a pressurizing process, so when the second valve port 13 is closed by the piston 5, the one-way valve core 81 moves away from the third valve port 14, the third valve port 14 is opened, and the second cavity 16 then communicates with the third cavity 17 through the third valve port 14.

Figure 6:
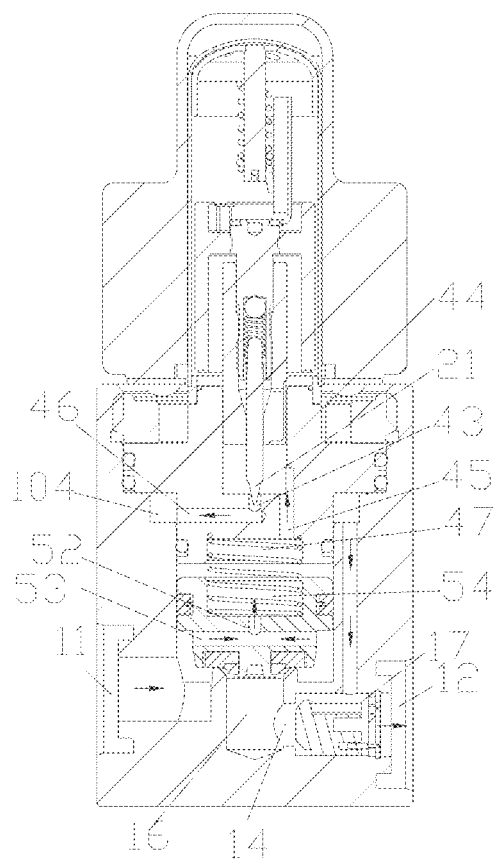
FIG. 6 is a schematic sectional view of the electric valve shown in FIG. 1 in a first throttling state.

As shown in FIG. 6, the electric valve is in a first throttling state, valve needle 21 is away from the first valve port 43 by a certain distance, the first valve port 43 is opened, but at least part of the valve needle 21 is in the first valve port 43. In the first throttling state, a flow area of the throttling passage formed between the valve needle 21 and the first valve port 43 is less than a cross-sectional area of the first valve port 43. In the first throttling state, the piston 5 abuts against the second valve port 13 under the action of the pressure difference of the fluid and the elastic force of the return spring 7, and the second valve port 13 is in a closed state. The first port 11 can communicate with the second port 12 through the second sub-passage 53, the first sub-passage 52, the second passage 45, the first valve port 43, the first passage 46, the annular passage 104, the bypass passage 15 and the third cavity 17 in sequence. In a case that the fluid flowing into the electric valve from the first port 11 is a high pressure refrigerant, the fluid is throttled and depressurized after passing through the throttling passage formed between the valve needle 21 and the first valve port 43, and the electric valve has the function of throttling in this case. It should be noted here that the flow area of the throttling passage formed between the valve needle 21 and the first valve port 43 is less than a flow area of the smallest passage among the second sub-passage 53, the first sub-passage 52 and the second passage 45. The flow area of the throttling passage formed between the valve needle 21 and the first valve port 43 can be controlled by the valve needle 21, thereby realizing the flow control and the throttling capacity meeting different requirements.

Figure 7:
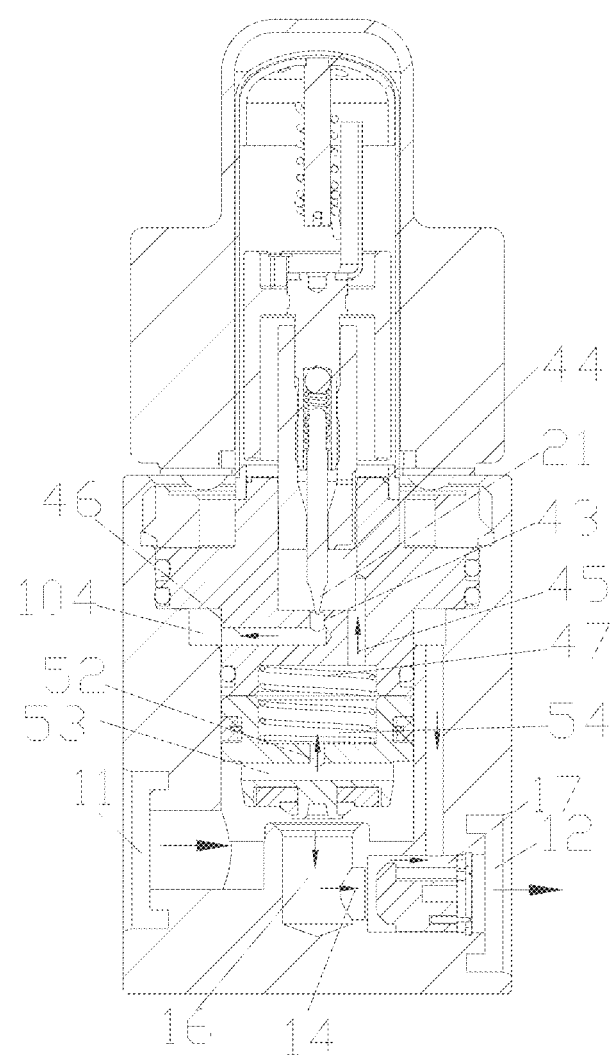
FIG. 7 is a schematic sectional view of the electric valve shown in FIG. 1 in a fully open state.

As shown in FIG. 7, the electric valve is in a fully open state, the valve needle 21 is away from the first valve port 43, the first valve port 43 is opened, and the valve needle is completely outside the first valve port 43. The first port 11 can communicate with the second cavity 16 through the second sub-passage 53, the first sub-passage 52, the second passage 45, the first valve port 43, the first passage 46, the annular passage 104, the bypass passage 15 and the third cavity 17 in sequence. Since the flow area of the throttling passage formed between the valve needle 21 and the first valve port 43 is greater than or equal to the cross-sectional area of the first valve port 43, the piston 5 moves upward to compress the return spring 7 under the action of the pressure difference of the fluid, the piston 5 moves away from the second valve port 13, and the second valve port 13 is opened. The first port 11 can communicate with the second port 12 through the second valve port 13, the second cavity 16, the third valve port 14 and the third cavity 17 in sequence. Since the flow resistance during the fluid sequentially passes through the second valve port 13, the second cavity 16, the third valve port 14 and the third cavity 17 is less than the flow resistance during the fluid sequentially passes through the second sub-passage 53, the first sub-passage 52, the second passage 45, the first valve port 43, the first passage 46, the annular passage 104, the bypass passage 15 and the third cavity 17, so most of the fluid flows out from the second port 12 after passing through the second valve port 13, the second cavity 16, the third valve port 14 and the third cavity 17 if the fluid flows in through the first port 11, realizing a fully open function.

Figure 8:
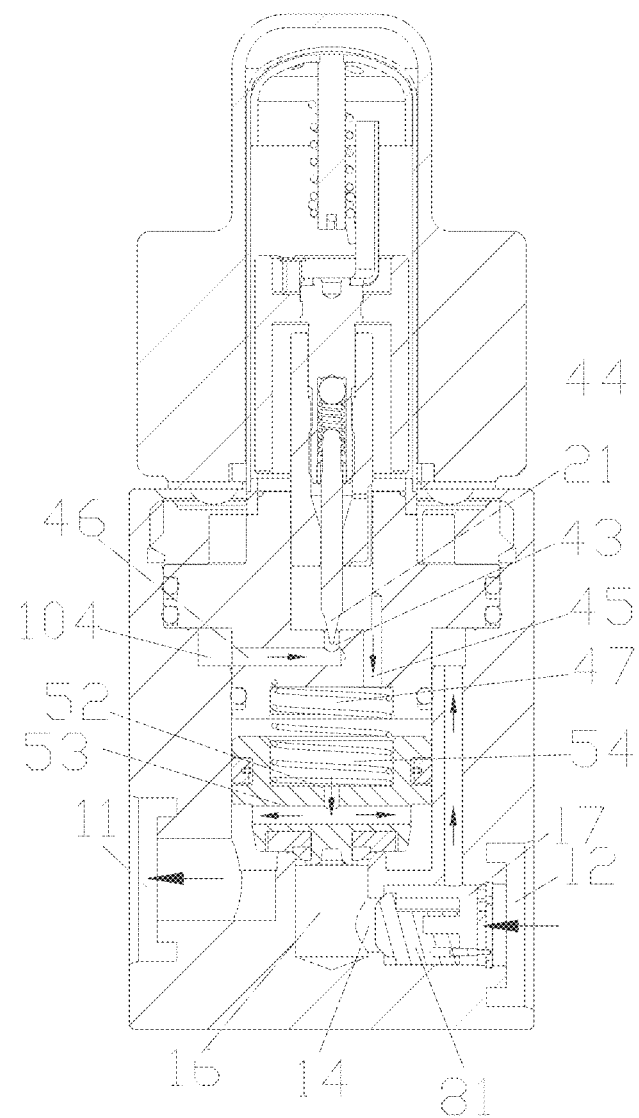
FIG. 8 is a schematic sectional view of the electric valve shown in FIG. 1 in a second throttling state.

As shown in FIG. 8, the electric valve is in a second throttling state. Since the third cavity 17 is further provided with the one-way valve, if the second port 12 serves as an inlet and the high pressure refrigerant flows in from the second port 12, the valve core 81 of the one-way valve driven by the high pressure refrigerant abuts against the third valve port 14, and the third valve port 14 is closed. At this time, the valve needle 21 driven by the rotor 22 moves away from the first valve port 43 by a certain distance, and the first valve port 43 is opened. The flow area of the throttling passage formed between the valve needle 21 and the first valve port 43 is less than or equal to a flow cross-sectional area of the first valve port 43, the piston 5 abuts against the second valve port 13 under the action of the return spring 7 and the pressure difference of the fluid, and the second valve port 13 is closed. The second port 12 can communicate with the first port 11 through the third cavity 17, the bypass passage 15, the annular passage 104, the first passage 46, the first valve port 43, the second passage 45, the first sub-passage 52, and the second sub-passage 53 in sequence.

Here, it should be noted that the first throttling state, the fully closed state and the fully open state can still be realized when no one-way valve is provided. Besides, the one-way valve is installed through the second port 12 in the present embodiment, but the one-way valve may also be installed in other ways, such as punching a hole at the bottom of the lower valve body 1. The installation methods can be selected according to the actual situation, and are not limited herein.

The above are merely specific embodiments of the present application and are not intended to limit the present application in any formal. Although the present application has been disclosed in the preferred embodiments, the embodiments are not intended to limit the present application. Any person skilled in the art can make many possible variations and modifications to the technical solutions of the present application, or bring equivalent embodiments of equivalent changes according to the technical contents disclosed above without departing from the scope of the technical solutions of the present application. Therefore, any simple modification, equivalent change and variation made to the above embodiments in accordance with the technical essence of the present application and without departing from the contents of the technical solutions of the present application still fall within the scope of protection of the technical solutions of the present application.

The invention claimed is:

1. An electric valve, comprising a valve body, a valve core assembly and a coil assembly, wherein, the valve core assembly comprises a piston, a valve seat, a valve needle and a rotor, a return spring is arranged between the piston and the valve seat, one end of the return spring abuts against the piston, another end of the return spring abuts against the valve seat, and the return spring is in a compressed state;

the valve seat is provided with a first valve port, the valve body is provided with a cavity having an open end, a second valve port is arranged in a bottom wall of the cavity having an open end, at least part of an outer wall of the valve seat is in sealing engagement with an inner wall of the cavity having an open end, and the piston is in sliding fit with the inner wall of the cavity having an open end; and the valve body is further provided with a first port, a second port, a second valve port and a bypass passage, the piston is provided with a fluid passage which is in communication with the first port and an end portion of the first valve port, one end portion of the first valve port is kept in communication with the first port, another end portion of the first valve port is in communication with the second port through the bypass passage, a third valve port is arranged between the second valve port and the second port, and a one-way valve is arranged between the third valve port and the second port.

2. The electric valve according to claim 1, wherein the cavity, having an open end, of the valve body comprises a first sub-cavity, a second sub-cavity and a third sub-cavity, the first sub-cavity, the second sub-cavity and the third sub-cavity are sequentially in communication with each other, an inner diameter of the first sub-cavity is greater than an inner diameter of the second sub-cavity, and the inner diameter of the second sub-cavity is greater than an inner diameter of the third sub-cavity;

the valve body further comprises a first cavity, a second cavity and a third cavity, the first cavity is in communication with the first port, the third cavity is in communication with the second port, the first cavity is in communication with the third sub-cavity, the second cavity is located below the third sub-cavity, the second valve port is located between the second cavity and the third sub-cavity, and the second cavity is located between the first cavity and the third cavity;

the first cavity is not in direct communication with the second cavity, the second cavity is in communication with the third cavity, the bypass passage is adjacent to the third sub-cavity, one end of the bypass passage is located at a bottom wall of the valve body forming the second sub-cavity, and another end of the bypass passage is located at a side wall forming the third cavity.

3. The electric valve according to claim 2, wherein a communication portion is further provided between the first cavity and the third sub-cavity, the communication portion is in communication with the first cavity and the third sub-cavity, and a bottom wall of the communication portion gradually rises and has a spiral structure in an extending direction from the first cavity to the third sub-cavity.

4. The electric valve according to claim 2, wherein the third valve port is arranged between the second cavity and the third cavity, the one-way valve is arranged in the third cavity, the one-way valve comprises a one-way valve core and a bracket, the one-way valve core is freely slidable along the bracket, and when the one-way valve core abuts against the third valve port, the bypass passage is in communication with the second port through the third cavity.

5. The electric valve according to claim 4, wherein the valve seat comprises a first valve seat body and a second valve seat body, the first valve seat body is adjacent to the second valve seat body, and an outer diameter of the first valve seat body is greater than an outer diameter of the second valve seat body;

the valve seat is further provided with a valve seat upper cavity, and the first valve port is arranged at a corresponding portion of a bottom wall of the valve seat upper cavity; and the valve seat is further provided with a first passage and a second passage, one end of the first valve port is in communication with the first passage, another end of the first valve port is in communication with the second passage, the second passage is in communication with outside of the valve seat through the bottom wall of the valve seat upper cavity, and one end of the first passage away from the first valve port is located on an outer wall of the second valve seat body, and the first passage is in communication with the bypass passage and the one end of the first valve port.

6. The electric valve according to claim 5, wherein the outer wall of the first valve seat body is in clearance fit with an inner wall of the first sub-cavity, at least one first sealing member is arranged between the outer wall of the first valve seat body and the inner wall of the first sub-cavity, one portion of the second valve seat body is in the first sub-cavity, one portion of the second valve seat body is located in the second sub-cavity, and one portion of the second valve seat body is located in the third sub-cavity;

an outer wall of the portion of the second valve seat body located in the third sub-cavity is in clearance fit with an inner wall of the third sub-cavity, and at least one second sealing member is arranged between the outer wall of the second valve seat body and the inner wall of the third sub-cavity; and a port of the first passage located on the outer wall of the second valve seat body is located in the second sub-cavity, an annular passage is formed between an inner wall of the second sub-cavity and the outer wall of the second valve seat body, and the annular passage is in communication with the first passage and the bypass passage.

7. The electric valve according to claim 6, wherein at least one annular tooth-shaped projection is arranged at a lower end portion of the first valve seat body, the tooth-shaped projection abuts against a bottom wall of the first sub-cavity, and hardness of the tooth-shaped projection is greater than hardness of the bottom wall of the first sub-cavity, and when the tooth-shaped projection abuts against the bottom wall of the first sub-cavity, the tooth-shaped projection is embedded into the bottom wall of the first sub-cavity; or at least one annular tooth-shaped projection is arranged at the bottom wall of the first sub-cavity, the tooth-shaped projection abuts against the lower end portion of the first valve seat body, the hardness of the tooth-shaped projection is greater than the hardness of the lower end portion of the first valve seat body, and when the tooth-shaped projection abuts against the lower end portion of the first valve seat body, the tooth-shaped projection is embedded into the lower end portion of the first valve seat body.

8. The electric valve according to claim 7, wherein the piston comprises a first piston body and a second piston body, and an outer diameter of the first piston body is greater than an outer diameter of the second piston body;

the piston is further provided with a piston upper cavity and a sealing block accommodating cavity, and the piston upper cavity and the sealing block accommodating cavity are located on opposite sides of the piston;

the piston is further provided with a first sub-passage and a second sub-passage, one end of the first sub-passage is located at a corresponding bottom wall of the piston upper cavity, another end of the first sub-passage is in communication with the second sub-passage, the second sub-passage is located below the first sub-passage, and the piston upper cavity is sequentially in communication with outside of the piston through the first sub-passage and the second sub-passage; and the second sub-passage comprises at least one port located at an outer wall of the second piston body, and an outer wall of the first piston body is in sliding fit with the inner wall of the third sub-cavity, a third sealing member is arranged between the outer wall of the first piston body and the inner wall of the third sub-cavity, there is a certain distance between the outer wall of the second piston body and the inner wall of the third sub-cavity, and the first cavity is kept in communication with the valve seat upper cavity through the second sub-passage, the first sub-passage, and the second passage.

9. The electric valve according to claim 8, wherein in a case that the first port serves as the inlet, the electric valve comprises a fully open state, a fully closed state and a first throttling state;

in the fully closed state, the valve needle abuts against the first valve port, the piston abuts against the second valve port, and the first port is not in communication with the second port;

in the first throttling state, the first valve port and the third valve port are open, the second valve port is closed, and a flow area of a throttling passage formed between the valve needle and the first valve port is less than or equal to a cross-sectional area of the first valve port, the first port is in communication with the second port through the second sub-passage, the first sub-passage, the second passage, the first valve port, the first passage, the annular passage, the bypass passage and the third cavity in sequence; and in the fully open state, the valve needle is away from the first valve port, the first valve port is opened, the valve needle is completely located outside the first valve port, the flow area of the throttling passage formed between the valve needle and the first valve port is larger than the flow area of the throttling passage formed between the valve needle and the first valve port in the first throttling state, the piston is away from the second valve port, the second valve port is opened, and the first port is in communication with the second port through the second valve port.

10. The electric valve according to claim 9, wherein in a case that the second port serves as the inlet, the electric valve comprises a second throttling state; and in the second throttling state, the valve needle is away from the first valve port, at least part of the valve needle is in the first valve port, the one-way valve core abuts against the third valve port, the third valve port is closed, the flow area of the throttling passage formed between the valve needle and the first valve port is less than or equal to the cross-sectional area of the first valve port, the piston abuts against the second valve port, the second valve port is closed, and the second port is in communication with the first port through the third cavity, the bypass passage, the annular passage, the first passage, the first valve port, the second passage, the first sub-passage and the second sub-passage in sequence.

11. An electric valve, comprising a valve body, a valve core assembly and a coil assembly, wherein the valve core assembly comprises a piston, a valve seat, a valve needle and a rotor, a return spring is arranged between the piston and the valve seat, one end of the return spring abuts against the piston, another end of the return spring abuts against the valve seat, and the return spring is in a compressed state;

the valve seat is provided with a first valve port, the valve body is provided with a cavity having an open end, and a second valve port is arranged on a bottom wall of the cavity having an open end;

at least two portions of an outer wall of the valve seat are in sealing engagement with an inner wall of the cavity having an open end, and the first valve port is located between the two portions of the valve seat in sealing engagement with the inner wall of the cavity having an open end;

the valve body is further provided with a first port, a second port, a second valve port and a bypass passage, the piston is provided with a fluid passage which is in communication with the first port and an end portion of the first valve port, one end portion of the first valve port is kept in communication with the first port, and another end portion of the first valve port is in communication with the second port through the bypass passage; and in a case that the valve needle is away from the first valve port and at least part of the valve needle is in the first valve port, a flow area of a throttling passage formed between the valve needle and the first valve port is less than a cross-sectional area of the first valve port, and the electric valve is in a throttling state.

12. The electric valve according to claim 11, wherein the cavity having an open end of the valve body comprises a first sub-cavity, a second sub-cavity and a third sub-cavity, the first sub-cavity, the second sub-cavity and the third sub-cavity are sequentially in communication with each other, an inner diameter of the first sub-cavity is greater than an inner diameter of the second sub-cavity, and the inner diameter of the second sub-cavity is greater than an inner diameter of the third sub-cavity;

the valve body further comprises a first cavity, a second cavity and a third cavity, the first cavity is in communication with the first port, the third cavity is in communication with the second port, the first cavity is in communication with the third sub-cavity, the second cavity is located below the third sub-cavity, the second valve port is located between the second cavity and the third sub-cavity, and the second cavity is located between the first cavity and the third cavity;

the first cavity is not in direct communication with the second cavity, the second cavity is in communication with the third cavity, the second cavity is in communication with the third cavity, the bypass passage is adjacent to the third sub-cavity, one end of the bypass passage is located on a bottom wall of the valve body forming the second sub-cavity, and another end of the bypass passage is located on a side wall of the third cavity.

13. The electric valve according to claim 12, wherein the valve seat is further provided with a valve seat upper cavity, and the first valve port is arranged at a corresponding portion of a bottom wall of the valve seat upper cavity; and the valve seat is further provided with a first passage and a second passage, one end of the first valve port is in communication with the first passage, another end of the first valve port is in communication with the second passage, the second passage is in communication with outside of the valve seat through a bottom wall of the valve seat upper cavity, and one end of the first passage away from the first valve port is located on an outer wall of a second valve seat body, and the first passage is in communication with the bypass passage and the one end of the first valve port; and the piston is further provided with a first sub-passage and a second sub-passage, one end of the first sub-passage is located at a corresponding bottom wall of a piston upper cavity, another end of the first sub-passage is in communication with the second sub-passage, the second sub-passage is located below the first sub-passage, and the piston upper cavity is sequentially in communication with outside of the piston through the first sub-passage and the second sub-passage; and the first cavity is kept in communication with the valve seat upper cavity through the second sub-passage, the first sub-passage, and the second passage.

14. The electric valve according to claim 13, wherein, the valve seat is further provided with a valve seat lower cavity, the second passage is in communication with the valve seat upper cavity and the valve seat lower cavity, a part of the valve needle is located in the valve seat upper cavity, and a part of the return spring is located in the valve seat lower cavity.

15. The electric valve according to claim 12, wherein a third valve port is arranged between the second cavity and the third cavity, and a one-way valve is arranged in the third cavity, the one-way valve comprises a one-way valve core and a bracket, the one-way valve core is slidable freely along the bracket; and the one-way valve core abuts against the third valve port, and the third valve port is closed, when a fluid pressure on a side where the second port is located is greater than a fluid pressure on a side where the third valve port is located.

16. The electric valve according to claim 13, wherein a third valve port is arranged between the second cavity and the third cavity, and a one-way valve is arranged in the third cavity, the one-way valve comprises a one-way valve core and a bracket, the one-way valve core is slidable freely along the bracket; and the one-way valve core abuts against the third valve port, and the third valve port is closed, when a fluid pressure on a side where the second port is located is greater than a fluid pressure on a side where the third valve port is located.

17. The electric valve according to claim 14, wherein a third valve port is arranged between the second cavity and the third cavity, and a one-way valve is arranged in the third cavity, the one-way valve comprises a one-way valve core and a bracket, the one-way valve core is slidable freely along the bracket; and the one-way valve core abuts against the third valve port, and the third valve port is closed, when a fluid pressure on a side where the second port is located is greater than a fluid pressure on a side where the third valve port is located.

* * * * *